Dec. 2, 1958  H. R. DITTMAR ET AL  2,862,799
SEPARATION OF TRI-(PHOSPHONITRILIC) CHLORIDE
Filed June 20, 1955
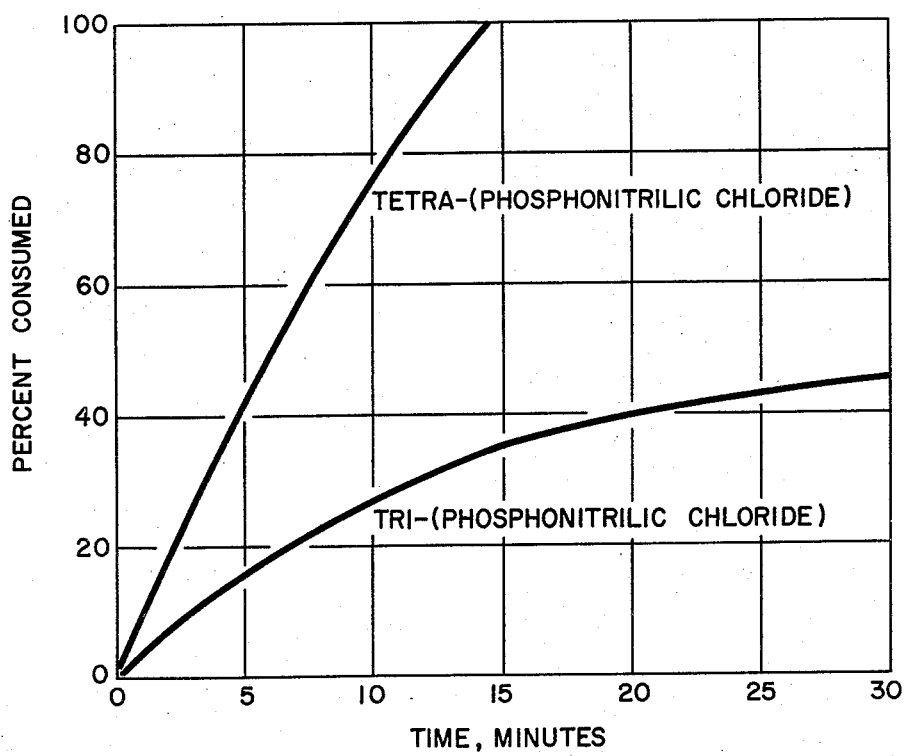
HARRY R. DITTMAR
JOHN H. BURNEY
 INVENTORS
BY Kenneth Swartwood 2,862,799

SEPARATION OF TRI-(PHOSPHONITRILIC CHLORIDE)

Harry R. Dittmar, Royal Oak, Mich., and John H. Burney, Orangeburg, S. C., assignors to Ethyl Corporation, New York, N. Y., a corporation of Delaware Application June 20, 1955, Serial No. 516,708

4 Claims. (Cl. 23—312)

This invention relates to a process of separating substantially pure tri-(phosphonitrilic chloride) from a mixture comprising this compound and at least one of its higher polymers.

Various methods for preparing phosphonitrilic chlorides are known. For example, the reaction between phosphorus pentachloride and ammonium chloride in the presence of s-tetrachloroethane as a solvent is reported in a literature. A particularly efficacious process involves reacting phosphorus pentachloride and ammonium chloride in ortho-dichlorobenzene as solvent.

All known processes for preparing phosphonitrilic chlorides involve the preparation of mixtures of various polymeric forms of these chlorides having the general formula $$(PNCl_2)_x$$

where $x$ is from 3 through 7 inclusive and higher. Of these polymers tri-(phosphonitrilic chloride) is particularly useful as a gasoline additive to control surface ignition and as a chemical intermediate. Tri-(phosphonitrilic chloride) also has pesticidal properties having been found particularly toxic to the greenhouse leaf tyer.

In attempting to effect a separation of tri-(phosphonitrilic chloride) from its higher polymers considerable difficulty has heretofore been encountered. Such difficulty arises by virtue of the similarity of the various polymers from the physical and chemical standpoints and the ease with which self-polymerization reactions occur. Prior methods of separating tri-(phosphonitrilic chloride) from its higher polymers leave much to be desired because, (1) the separation was not complete unless laborious and time-consuming operations such as sublimations were used and (2) considerable loss of product was encountered as, for example, by hydrolysis and other undesirable side reactions.

An object of this invention is to provide an effective, efficient and simple process of separating substantially pure tri-(phosphonitrilic chloride) from a mixture comprising tri-(phosphonitrilic chloride) and at least one higher polymer thereof. Other objects of this invention will be apparent from the ensuing description.

The above and other objects are accomplished by providing a process for separating substantially pure tri-(phosphonitrilic chloride) from a mixture comprising tri-(phosphonitrilic chloride) and at least one higher polymer thereof which comprises contacting said mixture with a liquid monohydric alcohol at a temperature and for a period of time sufficient to cause said higher polymer to pass into the liquid phase of said alcohol while leaving substantially pure tri-(phosphonitrilic chloride) in the solid state, and separating said tri-(phosphonitrilic chloride) from said liquid phase. While any monohydric alcohol which is liquid under the conditions of this process can be used, those containing from one to three carbon atoms—methanol, ethanol, propanol, and isopropanol—are preferred because these last mentioned alcohols enable an effective separation at a lower temperature and in a shorter period of time than do corresponding alcohols having higher molecular weights. Methanol is particularly preferred for use in the process of this invention because it enables the most effective separation of tri-(phosphonitrilic chloride) from its higher polymers.

Our process functions by causing the tetramer and higher molecular weight polymers of phosphonitrilic chloride to be substantially consumed by the alcohol leaving the solid tri-(phosphonitrilic chloride) virtually unaffected. By "consumed" is meant that the phosphonitrilic chlorides of higher molecular weight than the trimer are converted from the solid or semi-solid state of aggregation into a form which is soluble in the alcohol solvent. This conversion results either from selective solubility of the higher polymers in the alcohol or, more probably, from chemical reaction between such higher polymers and the alcohol to form products which are easily soluble in excess alcohol. In any event, the trimer can be easily separated as a solid from the resulting alcoholic solution by conventional methods.

A feature of this invention is that the alcohol used need not be anhydrous as the presence therein of up to about 5% by weight of water is not harmful. However, the alcohol should be free from alcoholates, particularly those of alkali metals such as sodium and potassium, because alcoholates react to some degree with tri-(phosphonitrilic chloride) even under the conditions used in this process. Thus, the present process should be conducted in alcoholate-free liquid monohydric alcohol.

The process of this invention is conducted at a temperature which brings about the separation of the phosphonitrilic chlorides higher than the trimer which are present in the original mixture. In other words, the temperature used is that which is sufficient to cause rapid consumption of such higher phosphonitrilic chloride polymers while leaving the tri-(phosphonitrilic chloride) virtually unaffected. The actual temperature ranges from about 0 to about 100° C. depending upon the particular alcohol used in the process of this invention. When using the preferred alcohols—monohydric alcohols containing from 1 to 3 carbon atoms—the temperature is from about 0 to about 50° C. With alcohols having from 4 to 6 carbon atoms in the molecule, the temperature is from about 25 to about 80° C. while with liquid monohydric alcohols having from 7 to about 10 carbon atoms the temperatures used are from about 50 to about 100° C. Slight deviations from the above temperature ranges are permissible although if the temperature is reduced much below the stated lower values, the efficiency of our process diminishes because a longer contact time is required. Temperatures appreciably in excess of the higher temperatures of the above ranges result in inefficient separation, probably resulting from chemical reactions occurring between tri-(phosphonitrilic chloride) and the alcohol.

The contact time as stated above is that which is sufficient to cause one or more polymers of phosphonitrilic chloride higher than the trimer polymer which are present in the initial mixture to be substantially consumed by the alcohol used. The contact time varies depending upon, first, the composition of the crude phosphonitrilic chloride mixture from which the trimer is being separated, second, the alcohol used and, third, the temperature employed. Generally, the length of contact time varies directly with the molecular weight of the alcohol since lower molecular weight alcohols—methanol through propanol—consume the higher molecular weight phosphonitrilic chloride polymers more rapidly than the alcohols havings higher molecular weights. The contact time varies inversely with the temperature used, that is, when the temperature used is at the upper end of the scale referred to above in connection with the temperature-alcohol relationship, the contact time should be kept short. Conversely, when the temperature used approaches the lower end of the above-referred-to relationship, the contact time can be progressively longer. Generally speaking, the contact time ranges from about 10 to about 250 minutes.

To remove the unconsumed tri-(phosphonitrilic chloride) from the alcoholic solution recourse can be had to conventional methods of separation such as filtration, centrifugation, decantation, and the like. Optional work-up procedure include washing with cold alcohol (preferably 0° or lower with alcohols which are liquid at these temperatures), water-washing to remove entrained alcohol and drying.

The process of this invention can be further understood by reference to the figure showing the rates of consumption of phosphonitrilic chloride polymers with methanol as measured at 25° C. The polymers used in this study were tri-(phosphonitrilic chloride) and tetra-(phosphonitrilic chloride), which had been carefully purified by sublimation procedures. The rates shown in the figure were obtained by determining the amount of the phosphonitrilic chloride polymers which remained in the solid state when in contact with methanol at 25° C. for the indicated periods of time. It is readily apparent that tetra-(phosphonitrilic chloride) is consumed in the alcohol much more rapidly than tri-(phosphonitrilic chloride). The higher polymers of phosphonitrilic chloride exhibit substantially the same rapid rate of consumption in the alcohol under the same conditions. Thus, by conducting the process of this invention on a mixture of phosphonitrilic chlorides comprising tri(phosphonitrilic chloride) and at least one higher polymer thereof a substantially complete separation of tri-(phosphonitrilic chloride) is readily effected.

The mechanism by which our process operates is not definitely known. It is believed, however, that the tetra and higher polymers of phosphonitrilic chloride undergo selective alcoholysis under the conditions of our process and are thus transformed into alcohol-soluble chemical forms whereas the residual tri-(phosphonitrilic chloride) remains unchanged.

This invention will be still further apparent from the following illustrative examples.

*Example I*

A crude mixture of phosphonitrilic chlorides comprising predominantly tri-(phosphonitrilic chloride) and tetra-(phosphonitrilic chloride) in a weight ratio of 3:1 respectively, was recovered after conducting a reaction between phosphorus pentachloride and ammonium chloride using tetrachloroethane as a solvent. This crude mixture melted over the range of 85–105° C. Six-hundred parts of this mixture was slurried with 500 parts of methanol at a temperature of 8° C. for 1.2 hours. The solid material was then removed from the methanol solution by filtration, washed with fresh methanol, water-washed and then dried. This residue—substantially pure tri-(phosphonitrilic chloride)—was recovered as a white crystalline solid melting at 111.5–113.2° C. (Literature: 114.0° C.) When subjected to infrared chemical analysis only 2.4% of tetra-(phosphonitrilic chloride) was detected in this residue.

*Example II*

To 18 parts by weight of a mixture consisting essentially of tri-(phosphonitrilic chloride) (75 percent by weight) and tetra-(phosphonitrilic chloride) (25 percent by weight) was added 20 parts of anhydrous methanol. The resulting mixture was stirred at 25° C. for 30 minutes, filtered, washed twice with methanol and then with water. The residue separated was a white crystalline material melting at 111–115° C. Infrared analysis indicated the presence of less than 3 percent of tetra-(phosphonitrilic chloride).

*Example III*

To a reaction vessel was charged 595 parts of anhydrous methyl alcohol. The alcohol was cooled to 5° C. with circulating ice water. To this alcohol was added 754 parts of a crude mixture of tri- and tetra-(phosphonitrilic chlorides), the rate of this addition being adjusted so that the temperature of the methyl alcohol would not exceed about 13° C. The mixture of phosphonitrilic chlorides so added initially had a melting range of 85 to 95° C. and contained about 25% by weight of the tetra isomer. After the addition of the phosphonitrilic chlorides to the alcohol, the temperature was regulated at 6 to 10° C. for 3.5 hours. The reaction slurry was then centrifuged to recover the crystalline residue. This residue was washed three times with methyl alcohol at 6° C. followed by six washes with water. The residue so treated was then air-dried at 60° C. to yield a product melting from 110 to 115° C. Infrared analysis showed the product to be substantially pure phosphonitrilic chloride trimer.

*Example IV*

One-hundred and fourteen parts of a mixture of tri- and tetra-(phosphonitrilic chlorides) melting from 85 to 97° C. was added to 600 parts of tertiary butyl alcohol while maintaining the temperature at 60° C. The system was stirred for 15 minutes at this temperature. At the end of this time the solid residue remaining was filtered from the alcohol and washed with 455 parts of cold water. After drying, the crystalline product melted at 112–115° C.

*Example V*

A crude mixture of phosphonitrilic chlorides comprising predominantly tri-(phosphonitrilic chloride) with lesser amounts of higher polymers thereof (tetramer through heptamer inclusive) is slurried with anhydrous ethanol at a temperature of 0° C. for 1.5 hours. The solid material remaining in the ethanol system is removed by filtration, washed with ethanol and water, and dried. This material is substantially pure tri-(phosphonitrilic chloride).

*Example VI*

The process of Example I is repeated using normal hexanol at 95° C. as the selective solvent, with the contact time being 1 hour. A substantially complete separation of the tri-(phosphonitrilic chloride) from the remaining polymers thereof is effected.

The above examples are presented for illustrative purposes only. Good results are obtained using other liquid monohydric alcohols, such as n-propanol, isopropanol, n-butanol, isobutanol, sec-butanol, tert-butanol, and likewise the various isomers of pentanol, hexanol, heptanol, octanol, nonanol and decanol which are liquids at the temperatures used in effecting the process of this invention.

As seen from the examples presented above, the course of the process of this invention can readily be followed by removing a sample of the solid material from the reaction mixture and determining its melting point. When the crystalline product so separated melts in the range of 114° C. a substantially complete separation of phosphonitrilic chloride polymers higher than the trimer from the latter has been effected.

In carrying out the process of this invention, it is preferred to slurry the mixture comprising tri-(phosphonitrilic chloride) and at least one higher polymer thereof in the alcohol solvent. Thus, the amount of alcohol used is that which is sufficient to form a slurry of the mixture of phosphonitrilic chloride from which tri-(phosphonitrilic chloride) is being separated.

Another manner of carrying out the process of this invention involves use of settling towers containing the alcohol solvent through which the mixture of phosphonitrilic chlorides is allowed to settle. As a modification of this method it is advantageous to use a countercurrent flow of solvent so as to increase the residence time of the phosphonitrilic chlorides in the alcoholic solvent. Other modifications include use of a tubular reactor whereby the phosphonitrilic chloride mixture is circulated by suitable pumping means through a coil or other tubular-type reactor for a period sufficient to bring about the separation of the higher polymers from the tri-(phosphonitrilic chloride). Other modifications of the process of this invention will now be apparent to one skilled in the art.

We claim:

1. The process of separating substantially pure tri-(phosphonitrilic chloride) from a mixture comprising tri-(phosphonitrilic chloride) and at least one higher polymer thereof which comprises contacting said mixture with a liquid alcoholate-free monohydric alcohol at a temperature from between about 0 to about 100° C. and for a period of time from about 10 to about 250 minutes thereby causing said higher polymer to pass into the liquid phase of said alcohol while leaving substantially pure tri-(phosphonitrilic chloride) in the solid state, and removing as a solid by physical separation said tri-(phosphonitrilic chloride) from said liquid phase.

2. The process of claim 1 in which said alcohol contains from one to three carbon atoms.

3. The process of claim 1 in which said alcohol is methanol.

4. The process of separating substantially pure tri-(phosphonitrilic chloride) from a mixture comprising predominantly tri-(phosphonitrilic chloride) and tetra-(phosphonitrilic chloride) which comprises slurrying said mixture in alcoholate-free methanol at a temperature from between about 0 to about 50° C. for a period of time from about 10 to about 250 minutes and removing as a solid by physical separation substantially pure solid tri-(phosphonitrilic chloride) from the methanol phase.

References Cited in the file of this patent

UNITED STATES PATENTS 2,443,168    Robson _____ June 8, 1948

OTHER REFERENCES

Stokes: Amer. Chem. Journal, vol. 17, 1895, pp. 288 and 289.

Yost and Russell: Systematic Inorganic Chemistry, 108–111, Prentice Hall Inc., 1944, New York, N. Y.

Mellor: Inorganic and Theoretical Chemistry, pages 722 and 723, vol. VIII (1928), Longmans, Green and Co., New York, N. Y.